US012785463B2

(12) United States Patent
Onda et al.

(10) Patent No.: US 12,785,463 B2

(45) Date of Patent: Nov. 3, 2026

(54) ROTATING ELECTRICAL MACHINE

(71) Applicant: KABUSHIKI KAISHA TOYOTA JIDOSHOKKI, Kariya (JP)

(72) Inventors: Hayato Onda, Kariya (JP); Tomoyoshi Inagaki, Kariya (JP); Yuki Okano, Kariya (JP)

(73) Assignee: KABUSHIKI KAISHA TOYOTA JIDOSHOKKI, Kariya (JP)

( * ) Notice: Subject to any disclaimer, the term of this patent is extended or adjusted under 35 U.S.C. 154(b) by 196 days.

(21) Appl. No.: 18/741,334

(22) Filed: Jun. 12, 2024

(65) Prior Publication Data

US 2025/0015645 A1 Jan. 9, 2025

(30) Foreign Application Priority Data

Jul. 6, 2023 (JP) ................................ 2023-111587

(51) Int. Cl.
*H02K 1/16* (2006.01)
*H02K 7/08* (2006.01)

(52) U.S. Cl.
CPC ................ *H02K 1/16* (2013.01); *H02K 7/08* (2013.01)

(58) Field of Classification Search
CPC .................................. H02K 1/16; H02K 7/08
See application file for complete search history.

(56) References Cited

U.S. PATENT DOCUMENTS 5,804,896 A 9/1998 Takehara et al.

FOREIGN PATENT DOCUMENTS

| | | | |
|---|---|---|---|
| JP | H8-182281 A | 7/1996 | |
| JP | 2002-209354 A | 7/2002 | |
| WO | 2021/079508 A1 | 4/2021 | |
| WO | WO-2021235647 A1 * | 11/2021 | ............... A47L 9/22 |

* cited by examiner

*Primary Examiner* — Terrance L Kenerly

(74) *Attorney, Agent, or Firm* — Sughrue Mion, PLLC

(57) ABSTRACT

A rotating electrical machine includes a rotor including a magnetic body and a shaft member, a stator including a stator core and coils, and a bearing rotatably supporting the shaft member. the stator core includes a yoke and teeth. The following equation is satisfied: La/2−Lb/2=Lc+Ld, wherein a point at a center of the yoke is defined as a center point, La/2 represents a length from the center point to an intersection point, Lb/2 represents a length from the center point to an intersection point, Lc represents a thickness of the yoke, and Ld represents a length of each of the teeth and wherein conditions of 0.15≤Lb/La≤0.35 and Lc/Ld≥0.35 are satisfied.

3 Claims, 3 Drawing Sheets

ROTATING ELECTRICAL MACHINE

CROSS-REFERENCE TO RELATED APPLICATION

This application claims priority to Japanese Patent Application No. 2023-111587 filed on Jul. 6, 2023, the entire disclosure of which is incorporated herein by reference.

BACKGROUND ART

The present disclosure relates to a rotating electrical machine.

A rotating electrical machine described in Japanese Patent Application Publication No. JP-2002-209354 includes a rotor and a stator. The rotor includes a magnetic body and a shaft member that rotates integrally with the magnetic body. The stator includes a stator core and coils. There is known a stator core having a yoke and teeth. The yoke has a tubular shape extending around an axial line of the shaft member in an axial direction of the shaft member. When a line extending in a perpendicular direction perpendicular to the axial line of the shaft member is defined as a perpendicular axial line, the teeth are located inside the yoke and extend from the yoke along the perpendicular axial line. The coils are each wound around a corresponding one of the teeth.

In the rotating electrical machine where the shaft member rotates at high speeds, a length of the shaft member in a direction perpendicular to the axial line of the shaft member may be shortened in order to suppress a loss of the rotor. In this case, in order to ensure an appropriate length of a gap between the shaft member and an end surface of each of the teeth in the perpendicular direction, a length from a center point on the perpendicular axial line at a center of the yoke to an intersection point between the perpendicular axial line and the end surface of each of the teeth need be shortened in correspondence with the length of the above-described shaft member. In addition, an area occupied by the coils need be ensured inside the yoke, and thus, there is a limit to shortening the length from the center point to the intersection point between the perpendicular axial line and an outer peripheral surface of the yoke. As a result, a ratio of the length from the center point to the intersection point between the perpendicular axial line and the end surface of each of the teeth to the length from the center point to the intersection point between the perpendicular axial line and the outer peripheral surface of the yoke falls within a specific range. In the rotating electrical machine in which the above-described ratio falls within the specific range, a thickness of the yoke decreases as a length of each of the teeth increases. However, a natural frequency of the rotating electrical machine depends on the length of each of the teeth and the thickness of the yoke, so that the natural frequency may fall within a range of an operating frequency of the rotating electrical machine. When the natural frequency is within the range of the operating frequency in the rotating electrical machine, resonance may occur with the driving of the rotating electrical machine, which generates noise caused by vibrations. Accordingly, in the rotating electrical machines, it has been desired to reduce the noise caused by such vibrations.

When the coils are wound around the teeth by distributed winding, an electromagnetic force that causes a vibrational excitation force applied to the teeth is distributed to each of the teeth. On the other hand, when the coils are each wound around a corresponding one of the teeth by concentrated winding, the electromagnetic force is not distributed to each of the teeth unlike the distributed winding, so that the electromagnetic force applied to the teeth in the coils wound around by the concentrated winding is larger than that in the coils wound around by the distributed winding. Accordingly, when the coils are each wound around the corresponding one of the teeth by the concentrated winding, a vibrational excitation force applied to the teeth is larger than that when the coils are wound around the teeth by the distributed winding. This may generate noise caused by vibrations of the teeth. Thus, also in the rotating electrical machine in which the coils are each wound around the corresponding one of the teeth by the concentrated winding, it has been desired to reduce the noise caused by the vibrations.

SUMMARY

In accordance with an aspect of the present disclosure, there is provided a rotating electrical machine that includes a rotor including a magnetic body and a shaft member that rotates integrally with the magnetic body, a stator including a stator core and coils, and a bearing rotatably supporting the shaft member in a housing that accommodates the rotating electrical machine. The stator core, when a line extending in a perpendicular direction perpendicular to an axial line of the shaft member is defined as a perpendicular axial line, includes a yoke formed in a tubular shape extending around the axial line in an axial direction in which the axial line of the shaft member extends and teeth located inside the yoke and extending from the yoke along the perpendicular axial line. The coils are each wound around a corresponding one of the teeth by concentrated winding. The following equation is satisfied: $La/2-Lb/2=Lc+Ld$, wherein a point on the perpendicular axial line at a center of the yoke when the yoke is viewed in the axial direction is defined as a center point, $La/2$ represents a length from the center point to an intersection point between the perpendicular axial line and an outer peripheral surface of the yoke, $Lb/2$ represents a length from the center point to an intersection point between the perpendicular axial line and an end surface of each of the teeth, $Lc$ represents a thickness of the yoke on the perpendicular axial line, and $Ld$ represents a length of each of the teeth on the perpendicular axial line and wherein conditions of $0.15 \leq Lb/La \leq 0.35$ and $Lc/Ld \geq 0.35$ are satisfied.

Other aspects and advantages of the disclosure will become apparent from the following description, taken in conjunction with the accompanying drawings, illustrating by way of example the principles of the disclosure.

BRIEF DESCRIPTION OF THE DRAWINGS

The disclosure, together with objects and advantages thereof, may best be understood by reference to the following description of the embodiments together with the accompanying drawings in which.

DETAILED DESCRIPTION OF THE EMBODIMENTS

The following will describe an embodiment of a rotating electrical machine with reference to the drawings.

<Basic Configuration of Rotating Electrical Machine>

Figure 1:
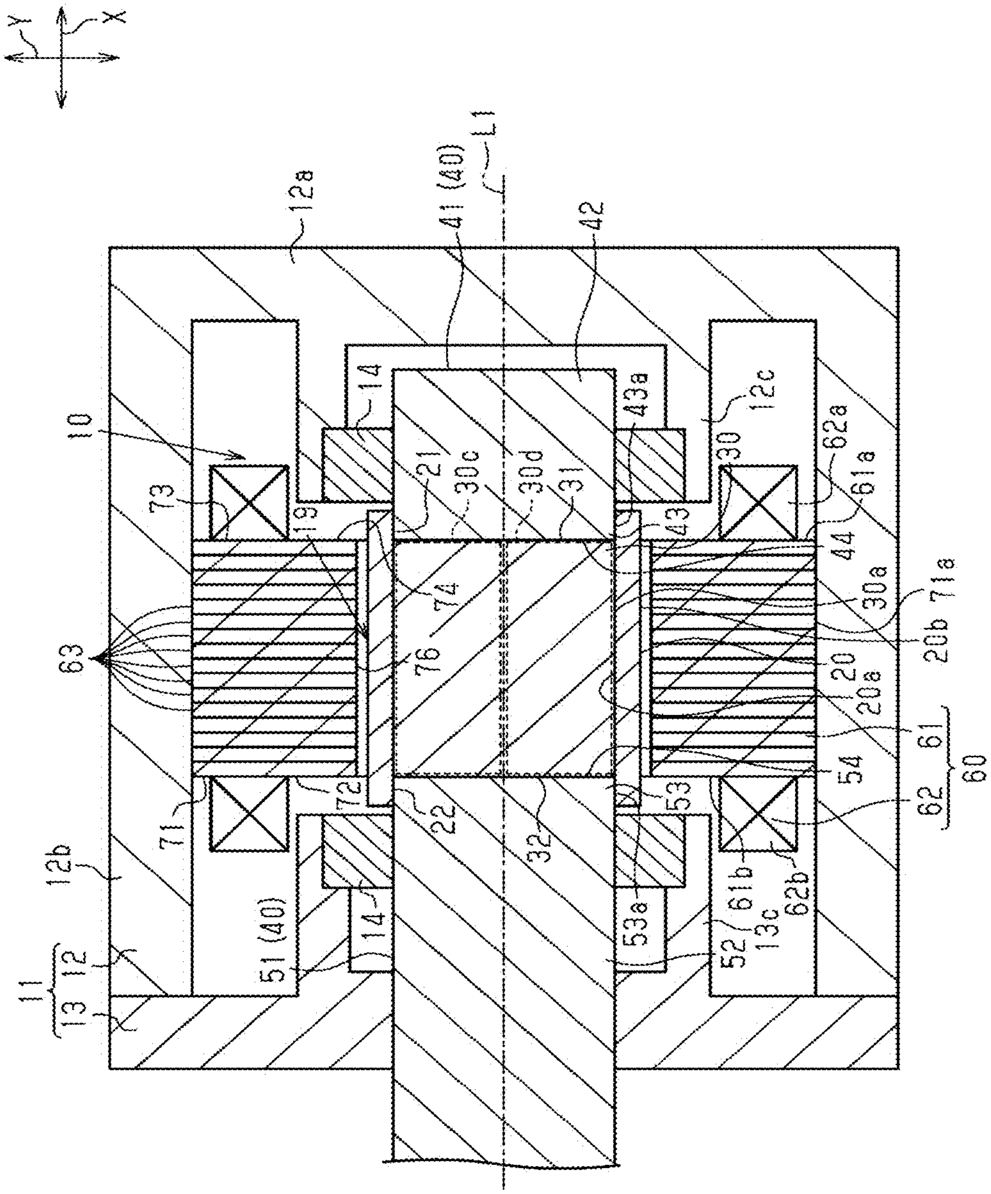
FIG. 1 is a schematic view schematically illustrating a cross section of a rotating electrical machine.

As illustrated in FIG. 1, a rotating electrical machine 10 includes a rotor 19 and a stator 60. The rotating electrical machine 10 is accommodated in a housing 11. The housing 11 includes a first housing component 12 and a second housing component 13 formed in a plate shape. The first housing component 12 and the second housing component 13 are made of metal such as aluminum.

The first housing component 12 has a bottom wall 12*a* formed in a plate shape and a peripheral wall 12*b* formed in a tubular shape extending from an outer peripheral end of the bottom wall 12*a*. One of openings of the peripheral wall 12*b* at opposite ends thereof is closed by the bottom wall 12*a*, and the other of the openings of the peripheral wall 12*b* is closed by the second housing component 13. The second housing component 13 is connected to the first housing component 12 while closing the opening of the peripheral wall 12*b*.

The first housing component 12 includes a first boss portion 12*c* formed in a cylindrical shape. The first boss portion 12*c* protrudes from an inner surface of the bottom wall 12*a*. The second housing component 13 includes a second boss portion 13*c* formed in a cylindrical shape. The second boss portion 13*c* protrudes from an inner surface of the second housing component 13. An axial line of the first boss portion 12*c*, an axial line of the second boss portion 13*c*, and an axial line of the peripheral wall 12*b* of the first housing component 12 coincide with each other.

The rotating electrical machine 10 includes bearings 14. The bearings 14 are each disposed on an inner peripheral surface of the first boss portion 12*c* and an inner peripheral surface of the second boss portion 13*c*.

<Configuration of Rotor>

The rotor 19 is located inside the housing 11. The rotor 19 includes a magnetic body 30 and shaft members 40 that rotate integrally with the magnetic body 30. For example, the rotor 19 has a cylindrical member 20.

The cylindrical member 20 is formed in a cylindrical shape. The cylindrical member 20 is made of metal, for example. An axial line of the cylindrical member 20 coincides with the axial line of the first boss portion 12*c* and the axial line of the second boss portion 13*c*. Hereinafter, a direction in which the axial line of the cylindrical member 20 extends is referred to as an axial direction X. An inner peripheral surface of the cylindrical member 20 is referred to as a cylindrical member inner surface 20*a*. An outer peripheral surface of the cylindrical member 20 is referred to as a cylindrical member outer surface 20*b*.

One of openings of the cylindrical member 20 at opposite ends thereof in the axial direction X is referred to as a first opening portion 21, and the other of the openings of the cylindrical member 20 at the opposite ends thereof in the axial direction X is referred to as a second opening portion 22. The first opening portion 21 and the second opening portion 22 are both circular holes. An inner diameter of the cylindrical member 20 is constant over an entire length of the cylindrical member 20 including the first opening portion 21 and the second opening portion 22 in the axial direction X. Hereinafter, a direction in which the inner diameter of the cylindrical member 20 extends is referred to as a radial direction Y.

<Configuration of Magnetic Body>

The magnetic body 30 is formed in a cylindrical shape, for example. The magnetic body 30 of the present embodiment is made of a permanent magnet. The magnetic body 30 is magnetized in the radial direction Y. The magnetic body 30 is formed of a first magnetic portion 30*c* and a second magnetic portion 30*d*. The first magnetic portion 30*c* of the magnetized magnetic body 30 corresponds to a N-pole. The second magnetic portion 30*d* of the magnetized magnetic body 30 corresponds to a S-pole. That is, the magnetic body 30 has two magnetic poles. The first magnetic portion 30*c* formed in a semi-cylindrical shape is one half of the magnetic body 30 in the radial direction Y. The second magnetic portion 30*d* formed in a semi-cylindrical shape is the other half of the magnetic body 30 in the radial direction Y.

The magnetic body 30 is disposed inside the cylindrical member 20. An axial line of the magnetic body 30 coincides with the axial line of the cylindrical member 20. A diameter of the magnetic body 30 is the same as the inner diameter of the cylindrical member 20. A direction in which the diameter of the magnetic body 30 extends is the same direction as the radial direction Y. The magnetic body 30 is, for example, press-fitted into the cylindrical member 20. The magnetic body 30 is fixed to the cylindrical member inner surface 20*a* by bringing an outer surface 30*a* of the magnetic body 30 into close contact with the cylindrical member inner surface 20*a*. One of opposite ends of the magnetic body 30 in the axial direction X is referred to as a first magnetic body end 31, and the other of the opposite ends of the magnetic body 30 in the axial direction X is referred to as a second magnetic body end 32.

<Configuration of Shaft Member>

The rotor 19 has two of the shaft members 40, for example. One of the shaft members 40 is referred to as a first shaft member 41, and the other of the shaft members 40 is referred to as a second shaft member 51. The first shaft member 41 and the second shaft member 51 are each formed in a cylindrical shape, for example. The first shaft member 41 and the second shaft member 51 are made of metal, for example.

Diameters of the first shaft member 41 and the second shaft member 51 are the same as the inner diameter of the cylindrical member 20. A direction in which the diameters of the first shaft member 41 and the second shaft member 51 extend is the same direction as the radial direction Y. An axial line of the first shaft member 41 coincides with an axial line of the second shaft member 51. These axial lines of the first shaft member 41 and the second shaft member 51 correspond to an axial line of the shaft members 40. The axial line of the shaft members 40 is referred to as an axial line L1. The axial line L1 coincides with the axial line of the cylindrical member 20, the axial line of the first boss portion 12*c*, and the axial line of the second boss portion 13*c*. A direction in which the axial line L1 extends is the same direction as the axial direction X. The axial direction X corresponds to an axial direction of the shaft members 40. The radial direction Y corresponds to a direction perpendicular to the axial line L1.

The first shaft member 41 and the second shaft member 51 are press-fitted into the cylindrical member 20. The first shaft member 41 has a first press-fitted portion 43 that is press-fitted into the cylindrical member 20 and a first exposed portion 42 that is not press-fitted into the cylindrical member 20. The second shaft member 51 has a second press-fitted portion 53 that is press-fitted into the cylindrical member 20 and a second exposed portion 52 that is not press-fitted into the cylindrical member 20.

The first press-fitted portion 43 is located in the cylindrical member 20 inside the first opening portion 21 of the cylindrical member 20 in the axial direction X. The first exposed portion 42 is exposed to the outside of the cylindrical member 20 from the first opening portion 21 of the cylindrical member 20 in the axial direction X. The second press-fitted portion 53 is located in the cylindrical member 20 inside the second opening portion 22 of the cylindrical member 20 in the axial direction X. The second exposed portion 52 is exposed to an outside of the cylindrical member 20 from the second opening portion 22 of the cylindrical member 20 in the axial direction X.

An outer peripheral surface of the first exposed portion 42 is supported by the bearing 14 disposed in the inner peripheral surface of the first boss portion 12*c*. Thus, the first shaft member 41 is rotatably supported in the housing 11. An outer peripheral surface of the second exposed portion 52 is supported by the bearing 14 disposed in the inner peripheral surface of the second boss portion 13*c*. Thus, the second shaft member 51 is rotatably supported in the housing 11. Accordingly, the bearings 14 rotatably support the shaft members 40 in the housing 11 that accommodates the rotating electrical machine 10.

A first outer peripheral surface 43*a* is an outer peripheral surface of the first press-fitted portion 43 and a second outer peripheral surface 53*a* is an outer peripheral surface of the second press-fitted portion 53. The first outer peripheral surface 43*a* and the second outer peripheral surface 53*a* are in close contact with the cylindrical member inner surface 20*a*. Thus, the first shaft member 41 and the second shaft member 51 are fixed to the cylindrical member inner surface 20*a*. The first shaft member 41 and the second shaft member 51 are rotatable integrally with the cylindrical member 20 and the magnetic body 30.

The first press-fitted portion 43 and the second press-fitted portion 53 are each adjacent to the magnetic body 30 in the axial direction X. In other words, the shaft members 40 and the magnetic body 30 are arranged side by side in the axial direction X with the magnetic body 30 interposed between the shaft members 40. An end of the first press-fitted portion 43 in the axial direction X is referred to as a first shaft member end 44. An end of the second press-fitted portion 53 in the axial direction X is referred to as a second shaft member end 54. The first shaft member end 44 is adjacent to the first magnetic body end 31 in the axial direction X. The second shaft member end 54 is adjacent to the second magnetic body end 32 in the axial direction X.

The first shaft member end 44 may be in contact with the first magnetic body end 31 or may be away from the first magnetic body end 31 in the axial direction X. The second shaft member end 54 may be in contact with the second magnetic body end 32 or may be away from the second magnetic body end 32 in the axial direction X.

The second exposed portion 52 extends through the second housing component 13 between the inside of the housing 11 and the outside of the housing 11 in the axial direction X. A rotating member that rotates integrally with the second shaft member 51 may be connected to an end of the second exposed portion 52, which is located outside the housing 11. An illustration of the rotating member is omitted. Here, the rotation of the second shaft member 51 is transmitted to the rotating member as a driving force, so that the rotating member is driven to rotate. The rotating electrical machine 10 in the present embodiment is, for example, a so-called turbo compressor that includes an impeller as a rotating member. Accordingly, in the rotating electrical machine 10 of the present embodiment, the shaft members 40 rotate at high speeds.

<Configuration of Stator>

The stator 60 is located inside the housing 11. The stator 60 is located outside the rotor 19 in the radial direction Y. The stator 60 includes a stator core 61 and coils 62.

<Configuration of Stator Core>

The stator core 61 is formed of a plurality of electromagnetic steel sheets 63 stacked in the axial direction X, for example. The stator core 61 has a first side surface 61*a* at one end of the stator core 61 in the axial direction X and a second side surface 61*b* at the other end of the stator core 61 in the axial direction X.

Figure 2:
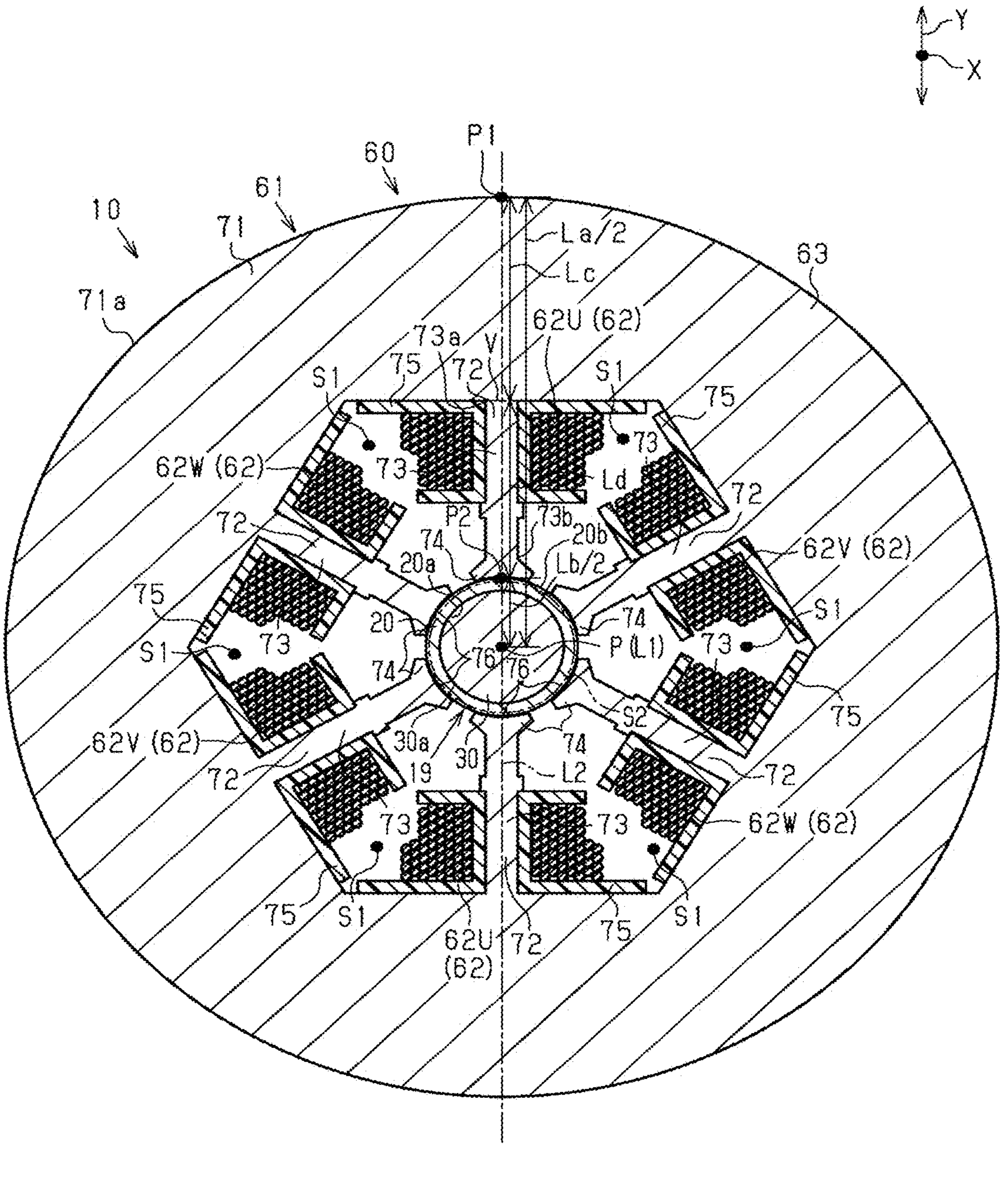
FIG. 2 is a cross-sectional view illustrating the rotating electrical machine.

As illustrated in FIG. 2, a line extending in the radial direction Y as the perpendicular direction perpendicular to the axial line L1 of the shaft members 40 is referred to as a perpendicular axial line L2. The stator core 61 has a yoke 71 extending in the axial direction X and teeth 72 located inside the yoke 71, for example. The yoke 71 is formed in a tubular shape extending around the axial line L1. The yoke 71 is, for example, formed in a cylindrical shape. The stator core 61 has, for example, six of the teeth 72. The teeth 72 extend from the yoke 71 along the perpendicular axial line L2.

Slots S1 are formed inside the stator core 61. The slots S1 are spaces each located between teeth 72 arranged side by side in a circumferential direction of the yoke 71. Six of the slots S1 are arranged in the circumferential direction of the yoke 71.

The teeth 72 have teeth main body portions 73 and teeth end portions 74. The teeth main body portions 73 are each formed in a shaft shape extending in the radial direction Y as the perpendicular direction from the yoke 71. One of opposite end portions of each of the teeth main body portions 73 in the radial direction Y as the perpendicular direction is defined as a first end portion 73*a*, which is connected to the yoke 71. The other of the opposite end portions of each of the teeth main body portions 73 in the radial direction Y is defined as a second end portion 73*b*, which is located opposite to the first end portion 73*a* across the teeth main body portion 73. The teeth end portions 74 each extend from the second end portion 73*b* in the circumferential direction of the yoke 71.

One of opposite end portions of each of the teeth end portions 74 in the radial direction Y is connected to the corresponding one of the teeth main body portions 73. An end surface 76 is located at the other of the opposite end portions of each of the teeth end portions 74 in the radial direction Y. An internal space S2 is defined by the end surfaces 76 of the teeth end portions 74. The end surfaces 76 of the teeth end portions 74 are located at ends at the teeth 72 in the radial direction Y as the perpendicular direction. Accordingly, hereinafter, the end surfaces 76 are also referred to as the end surfaces 76 of the teeth 72. The end surfaces 76 of the teeth end portions 74 are curved surfaces extending parallel to inner peripheral surfaces of the yoke 71. The internal space S2 extends in the axial direction X. The internal space S2 having a cylindrical shape is defined by the end surfaces 76 of the six of the teeth 72 inside the stator core 61.

The magnetic body 30 is located in the internal space S2. Specifically, the magnetic body 30 and the cylindrical member 20 are located in the internal space S2. In a cross-section of the stator core 61 and the cylindrical member 20 as viewed in the axial direction X, the end surfaces 76 of the teeth end portions 74 face the cylindrical member outer surface 20*b*. The end surfaces 76 of the teeth end portions 74 face the outer surface 30*a* of the magnetic body 30 with the cylindrical member 20 interposed therebetween. The end surfaces 76 of the teeth end portions 74 are the curved surfaces extending along the cylindrical member outer surface 20*b*. The end surfaces 76 of the teeth end portions 74 are away from the cylindrical member outer surface 20*b* in the radial direction Y. That is, the end surfaces 76 of the teeth end portions 74 are also away from the outer surface 30*a* of the magnetic body 30 in the radial direction Y. The end surfaces 76 of the teeth end portions 74 are parallel to the outer surface 30*a* of the magnetic body 30.

A part of the inner peripheral surface of the yoke 71 and a part of an outer surface of each of the teeth main body portions 73 are covered by resin members 75. The resin members 75 are each formed in the corresponding one of the teeth 72.

As illustrated in FIG. 1, an outer peripheral surface 71*a* of the yoke 71 is fixed to an inner peripheral surface of the peripheral wall 12*b* of the first housing component 12. Thus, the stator core 61 is fixed to the housing 11 by fixing the yoke 71 to the first housing component 12.

<Configuration of Coil>

As illustrated in FIG. 2, the coils 62 are each wound around a corresponding one of the teeth 72 by concentrated winding. The coils 62 are each wound around a corresponding one of the teeth main body portions 73 from an outside of a corresponding one of the resin members 75. The stator core 61 is insulated from the coils 62 by the resin members 75.

Each of the coils 62 is wound around a portion of the corresponding one of the teeth main body portions 73 near the yoke 71 in the radial direction Y as the perpendicular direction and is not wound around a portion of the corresponding one of the teeth main body portions 73 near a corresponding one of the teeth end portions 74 in the radial direction Y as the perpendicular direction. Thus, each of the coils 62 is wound around the portion of the corresponding one of the teeth main body portions 73 closer to the yoke 71 than the corresponding one of the teeth end portion 74 in the radial direction Y.

The coils 62 includes u-phase coils 62U, v-phase coils 62V, and w-phase coils 62W. A part of each of the u-phase coils 62U wound around one of the teeth 72 passes through the corresponding slots S1. The same goes for each v-phase coil 62V and each w-phase coil 62W. Each of the u-phase coils 62U, the v-phase coils 62V, and the w-phase coils 62W is electrically connected to an inverter, which is not illustrated. Power from the inverter is supplied to the u-phase coils 62U, the v-phase coils 62V, and the w-phase coils 62W, which rotates the rotor 19.

As illustrated in FIG. 1, each of the coils 62 has a first coil end 62*a* and a second coil end 62*b*. The first coil end 62*a* protrudes from the first side surface 61*a* of the stator core 61 toward the bottom wall 12*a* of the first housing component 12. The second coil end 62*b* protrudes from the second side surface 61*b* of the stator core 61 toward the second housing component 13. Thus, the first coil end 62*a* and the second coil end 62*b* are coil ends protruding from side surfaces of the stator core 61 in the axial direction X.

The first coil end 62*a* surrounds the bearing 14 from the outside thereof in the radial direction Y. Specifically, the first coil end 62*a* surrounds the first boss portion 12*c* and the bearing 14 disposed in the inner peripheral surface of the first boss portion 12*c* from the outside thereof in the radial direction Y. The first coil end 62*a* is away from the first boss portion 12*c* in the radial direction Y. The second coil end 62*b* surrounds the bearing 14 from the outside thereof in the radial direction Y. Specifically, the second coil end 62*b* surrounds the second boss portion 13*c* and the bearing 14 disposed in the inner peripheral surface of the second boss portion 13*c* from the outside thereof in the radial direction Y. The second coil end 62*b* is away from the second boss portion 13*c* in the radial direction Y.

The bearing 14 disposed in the inner peripheral surface of the first boss portion 12*c* is located between the first coil end 62*a* and the first exposed portion 42 in the radial direction Y. The bearing 14 disposed in the inner peripheral surface of the second boss portion 13*c* is located between the second coil end 62*b* and the second exposed portion 52 in the radial direction Y. Accordingly, the bearings 14 are each located between the first coil end 62*a* as the coil end and one of the shaft members 40 and between the second coil end 62*b* as the coil end and the other of the shaft members 40 in the radial direction Y as the perpendicular direction. In the present embodiment, the first boss portion 12*c* and the bearing 14 disposed in the inner peripheral surface of the first boss portion 12*c* are located between the first coil end 62*a* and the first exposed portion 42 in the radial direction Y. The second boss portion 13*c* and the bearing 14 disposed in the inner peripheral surface of the second boss portion 13*c* are located between the second coil end 62*b* and the second exposed portion 52 in the radial direction Y.

<Lengths of Stator Core>

As illustrated in FIG. 2, a point on the perpendicular axial line L2 at a center of the yoke 71 when the yoke 71 is viewed in the axial direction X is defined as a center point P. The center point P is also located on the axial line L1 of the shaft members 40. An intersection point between the perpendicular axial line L2 and the outer peripheral surface 71*a* of the yoke 71 is defined as a first intersection point P1. A length from the center point P to the first intersection point P1 is represented by La/2. The length La/2 corresponds to an outer diameter of the stator core 61. An intersection point between the perpendicular axial line L2 and the end surface 76 of each of the teeth 72 is defined as a second intersection point P2. A length from the center point P to the second intersection point P2 is represented by Lb/2. The length Lb/2 corresponds to an inner diameter of the stator core 61. A thickness of the yoke 71 on the perpendicular axial line L2 is represented by Lc, and a length of each of the teeth 72 on the perpendicular axial line L2 is represented by Ld. The length Ld corresponds to a length between an extending surface V and the end surface 76 of each of the teeth 72 in the radial direction Y. Here, the extending surface V is a surface obtained by extending adjacent two of the inner peripheral surfaces of the yoke 71 with one of the teeth 72 interposed therebetween in the circumferential direction of the yoke 71 toward each other. The length Lc corresponds to a length obtained by subtracting the length Ld from a length between the outer peripheral surface 71*a* of the yoke 71 and the end surface 76 of each of the teeth 72 in the radial direction Y. Here, the following equation is satisfied: $La/2-Lb/2=Lc+Ld$, wherein conditions of $0.15 \leq Lb/La \leq 0.35$ and $Lc/Ld \geq 0.35$ are satisfied.

<Relationship Among Lengths of Stator Core, Natural Frequency, and OA Value>

Figure 3:
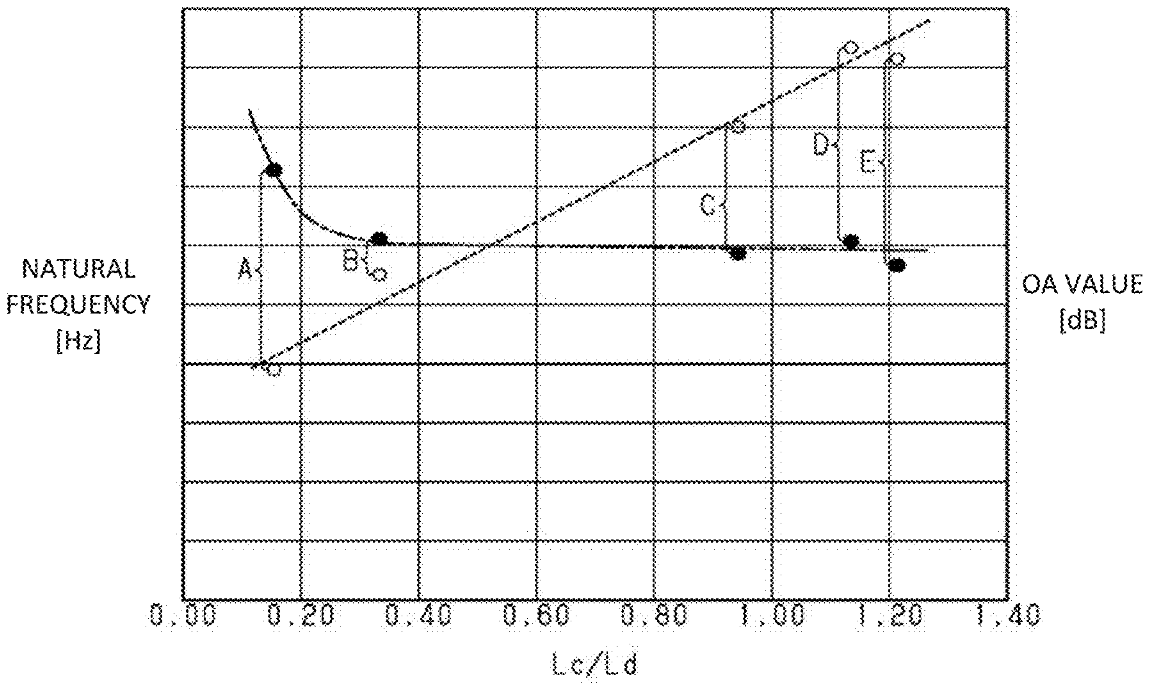
FIG. 3 is a graph showing a natural frequency and an OA value in examples of the present disclosure and comparative examples.

As illustrated in FIG. 3, in the rotating electrical machine 10 of each of comparative examples and each of examples of the present disclosure, a natural frequency and an OA value were measured when the shaft members 40 rotate at a predetermined rotational speed. The comparative examples include a first comparative example A and a second comparative example B. The examples of the present disclosure include a first example C, a second example D, and a third example E. The natural frequency and the OA value were measured in each of the examples A to E. The OA value means an overall value, which indicates volume of sound generated from the rotating electrical machine 10 in each example.

In the first comparative example A, the second comparative example B, the first example C, the second example D, and the third example E, the lengths La/2 and Lb/2 were set so that the condition of $0.15 \leq Lb/La \leq 0.35$ was satisfied. The length Lc and Ld were set so that a ratio of Lc/Ld is increased in an order of the first comparative example A, the second comparative example B, the first example C, the second example D, and the third example E.

In FIG. 3, the natural frequency is represented by a plot with empty circle markers, and the OA value is represented by a plot with filled circle markers. The natural frequency increases in an order of the first comparative example A, the second comparative example B, the first example C, and the second example D, and then, decreases slightly in the third example E as compared with the second example D. Accordingly, as illustrated by a dotted line in FIG. 3, the natural frequency tends to increase as the ratio of Lc/Ld increases. On the other hand, the OA value decreases in an order of the first comparative example A, the second comparative example B, and the first example C, increases slightly in the second example D as compared with the first example C, and decreases slightly in the third example E as compared with the second example D.

In a relationship between the natural frequency and the OA value, the OA value commonly decreases as the natural frequency increases. A behavior of the OA value estimated from measurement results in the above-described examples is represented by a dashed-and-dotted line in FIG. 3. This behavior is changed at a boundary of the ratio Lc/Ld of 0.35. Specifically, within a range in which the ratio Lc/Ld is less than 0.35, the OA value decreases as the Lc/Ld increases. Within a range in which the ratio Lc/Ld is equal to or more than 0.35, the OA value is almost constant even when the ratio Lc/Ld is changed.

Accordingly, from the above-described measurements results, it is shown that noise generated with the driving of the rotating electrical machine 10 in which the ratio Lc/Ld is equal to or more than 0.35 is smaller than that generated with the driving of the rotating electrical machine 10 in which the ratio Lc/Ld is less than 0.35. Furthermore, it is shown that the noise is effectively reduced regardless of a magnitude of the ratio Lc/Ld as long as the ratio Lc/Ld is equal to or more than 0.35.

Operation of Embodiment

The following will describe an operation of the present embodiment.

In the rotating electrical machine 10 in which the shaft members 40 rotate at high speeds, a length of each of the shaft members 40 in the radial direction Y may be shortened in order to suppress a loss of the rotor 19. In particular, when the rotating electrical machine 10 is a turbo compressor, a rotational speed of the shaft members 40 in the turbo compressor is higher than that in a displacement compressor, and thus, the length of each of the shaft members 40 in the radial direction Y is preferably shortened as described above. In such a case, in order to ensure an appropriate length of a gap between the shaft members 40 and the end surface 76 of each of the teeth 72 in the radial direction Y, the length Lb/2 from the center point P of the yoke 71 to second intersection point P2 need be shortened in correspondence with the above-described length of each of the shaft members 40. In addition, an area occupied by the coils 62 need be ensured inside the yoke 71. Specifically, a width of each of the slots S1 where the coil 62 is located in the circumferential direction of the yoke 71 becomes smaller as each of the slots S1 extends toward the rotor 19 in the radial direction Y, and thus, it is necessary to ensure the area occupied by the coils 62 in the slots S1 by ensuring the length of each of the teeth 72. Thus, there is a limit to shortening the length La/2 from the center point P to the first intersection point P1. With this limitation, the ratio of the length Lb/2 to the length La/2 is set to a value within the specific range represented by $0.15 \leq Lb/La \leq 0.35$. In the rotating electrical machine 10 in which the above-described ratio is within the specific range, the length Lc, which is the thickness of the yoke 71, decreases as the length Ld, which is the length of each of the teeth 72, increases.

In the rotating electrical machine 10 of the present embodiment, the ratio Lc/Ld is equal to or more than 0.35. The length Lc is increased while the length Ld is kept so that the area occupied by the coils 62 is ensured in the slots S1, so that the above-described condition in which the ratio Lc/Ld is equal to or more than 0.35 is satisfied. As a result, a proportion of the length of each of the teeth 72 in the length of the stator core 61 in the radial direction Y becomes smaller than that when the ratio Lc/Ld is less than 0.35.

Advantageous Effects of Embodiment

The following will describe advantageous effects of the present embodiment.

(1) The ratio Lc/Ld is set to be equal to or more than 0.35. Accordingly, the proportion of the length of each of the teeth 72 in the length of the stator core 61 in the radial direction Y when the ratio Lc/Ld is equal to or more than 0.35 is smaller than that when the ratio Lc/Ld is less than 0.35, so that the teeth 72 hardly vibrates with the driving of the rotating electrical machine 10. In addition, as compared with the case where the ratio Lc/Ld is less than 0.35, the natural frequency of the rotating electrical machine 10 is increased to an outside of a range of the operating frequency of the rotating electrical machine 10, which suppresses occurrence of resonance with the driving of the rotating electrical machine 10. Thus, in the rotating electrical machine 10 in which the coils 62 are each wound around the corresponding one of the teeth 72 by the concentrated winding and from which noise caused by the vibrations of the teeth 72 is easily generated, the noise caused by the vibrations with the driving of the rotating electrical machine 10 is suppressed.

(2) The slots S1 are formed inside the stator core 61 and each of the slots S1 is the space located between the teeth 72 arranged side by side in the circumferential direction of the yoke 71. Six of the slots S1 are arranged in the circumferential direction of the yoke 71. The magnetic body 30 is magnetized in the radial direction Y and has two magnetic poles. Such a stator 60 has a second-order vibration mode of circular ring in which the stator 60 is deformed so as to have an elliptical cross-section. Accordingly, in the rotating electrical machine 10 including the above-described stator 60, noise generated with the driving of the rotating electrical machine 10 tends to increase as compared with a rotating electrical machine including a stator that has a vibration mode of circular ring excluding the second order mode. Thus, the noise caused by the vibrations with the driving of the rotating electrical machine 10 is reduced, so that the noise is reduced even in the rotating electrical machine 10, which tends to be noisy as described above.

(3) Each of the coil 62 is wound around the portion of the corresponding one of the teeth main body portions 73 near the yoke 71 in the radial direction Y, and is not wound around the portion of the corresponding one of the teeth main body portions 73 near the corresponding one of the teeth end portions 74 in the radial direction Y. With this winding, as compared with a case where each of the coils 62 is wound around the corresponding one of the teeth main body portions 73 over an entire length thereof in the radial direction Y, a center of gravity of the one of the teeth 72 around which the coil 62 is wound is displaced near the yoke 71 in the radial direction Y. This further reduces the vibrations of the teeth 72 with the driving of the rotating electrical machine 10. Thus, the noise caused by the vibrations with the driving of the rotating electrical machine 10 is further reduced.

(4) Each of the coils 62 has the first coil end 62*a* and the second coil end 62*b* as the coil ends. The first coil end 62*a* protrudes from the first side surface 61*a* as the side surface of the stator core 61 in the axial direction X. The second coil end 62*b* protrudes from the second side surface 61*b* as the side surface of the stator core 61 in the axial direction X. The bearings 14 are each located between the first coil end 62*a* and the one of the shaft members 40 and between the second coil end 62*b* and the other of the shaft members 40 in the radial direction Y as the perpendicular direction. In such a rotating electrical machine 10, the length Ld of each of the teeth 72 may be lengthened in order to form spaces where the bearings 14 are disposed between the first coil end 62*a* and the one of the shaft members 40 and between the second coil end 62*b* and the other of the shaft members 40. Also in the rotating electrical machine 10 having such a length Ld, the noise caused by the vibrations of the teeth 72 with the driving of the rotating electrical machine 10 is reduced.

[Modifications]

The embodiment may be modified as follows. The embodiment and the following modifications may be combined with each other as long as they do not technically contradict each other.

The yoke 71 may be formed in a tubular shape other than the cylindrical shape, such as a polygonal tubular shape.

The number of the slots S1 formed inside the stator core 61 may be less than six or may be seven or more. In this case, the number of the teeth 72 in the stator core 61 increases or decreases in correspondence with the number of the slots S1.

The magnetic body 30 may have four or more magnetic poles.

The magnetic body 30 may be magnetized in a direction other than the radial direction Y. For example, the magnetic body 30 may be magnetized in the axial direction X.

The magnetic body 30 is not limited to a permanent magnet. The magnetic body 30 may be, for example, a laminated core, an amorphous core, a compressed powder core, or the like.

The magnetic body 30 may be formed in a shape other than the cylindrical shape. The magnetic body 30 may be formed in a rectangular parallelepiped shape. The magnetic body 30 need not be adjacent to the shaft members 40 in the axial direction X. The magnetic body 30 may be formed in a tubular shape extending in the axial direction X and may cover the shaft members 40 from the outside thereof.

The first shaft member 41 may be omitted in the shaft members 40.

Each of the coils 62 may be a coil that is wound around the portion of the corresponding one of the teeth main body portions 73 near the corresponding one of the teeth end portions 74 in the radial direction Y and is not wound around the portion of each of the teeth main body portions 73 near the yoke 71 in the radial direction Y. Each of the coils 62 may be a coil that is wound around a middle portion of the corresponding one of the teeth main body portions 73 in the radial direction Y and is not wound around the opposite end portions of the corresponding one of the teeth main body portions 73 in the radial direction Y. Each of the coils 62 may be wound around the corresponding one of the teeth main body portions 73 over the entire length thereof in the radial direction Y.

The stator core 61 need not be formed of the plurality of stacked electromagnetic steel sheets 63. For example, the stator core 61 may be made of one member.

What is claimed is:

1. A rotating electrical machine comprising:

a rotor including a magnetic body and a shaft member that rotates integrally with the magnetic body;

a stator including a stator core and coils; and a bearing rotatably supporting the shaft member in a housing that accommodates the rotating electrical machine, the stator core, when a line extending in a perpendicular direction perpendicular to an axial line of the shaft member is defined as a perpendicular axial line, including a yoke formed in a tubular shape extending around the axial line in an axial direction in which the axial line of the shaft member extends and teeth located inside the yoke and extending from the yoke along the perpendicular axial line, and the coils being each wound around a corresponding one of the teeth by concentrated winding, wherein the following equation is satisfied:

$$La/2 - Lb/2 = Lc + Ld,$$

wherein a point on the perpendicular axial line at a center of the yoke when the yoke is viewed in the axial direction is defined as a center point, La/2 represents a length from the center point to an intersection point between the perpendicular axial line and an outer peripheral surface of the yoke, Lb/2 represents a length from the center point to an intersection point between the perpendicular axial line and an end surface of each of the teeth, Lc represents a thickness of the yoke on the perpendicular axial line, and Ld represents a length of each of the teeth on the perpendicular axial line, and wherein conditions of $0.15 \le Lb/La \le 0.35$ and $Lc/Ld \ge 0.35$ are satisfied, and in a radial direction of the stator, a thickness of a portion of the yoke that is continuous with the teeth in the radial direction is greater than a thickness of a portion of the yoke between the outer peripheral surface and a space between the coils within the slot.

2. The rotating electrical machine according to claim 1, wherein slots that are spaces each located between the teeth arranged side by side in a circumferential direction of the yoke are formed inside the stator core, six of the slots are arranged in the circumferential direction of the yoke, and the magnetic body is magnetized in the perpendicular direction and has two magnetic poles.

3. The rotating electrical machine according to claim 1, wherein the teeth have teeth main body portions that are each formed in a shaft shape extending in the perpendicular direction from the yoke and the teeth have teeth end portions, one of opposite end portions of each of the teeth main body portions in the perpendicular direction is defined as a first end portion, which is connected to the yoke, and the other of the opposite end portions of each of the teeth main body portions in the perpendicular direction is defined as a second end portion, which is located opposite to the first end portion across the teeth main body portion, the teeth end portions extend from opposite sides of the second end portion in the circumferential direction of the yoke, and each of the coils is wound around a portion of a corresponding one of the teeth main body portions near the yoke in the perpendicular direction and is not wound around a portion of the corresponding one of the teeth main body portions near a corresponding one of the teeth end portions in the perpendicular direction.

* * * * *